Jan. 16, 1940.  A. W. LISSAUER  2,187,501
TREATMENT OF WASTE MATERIAL
Original Filed Oct. 24, 1936
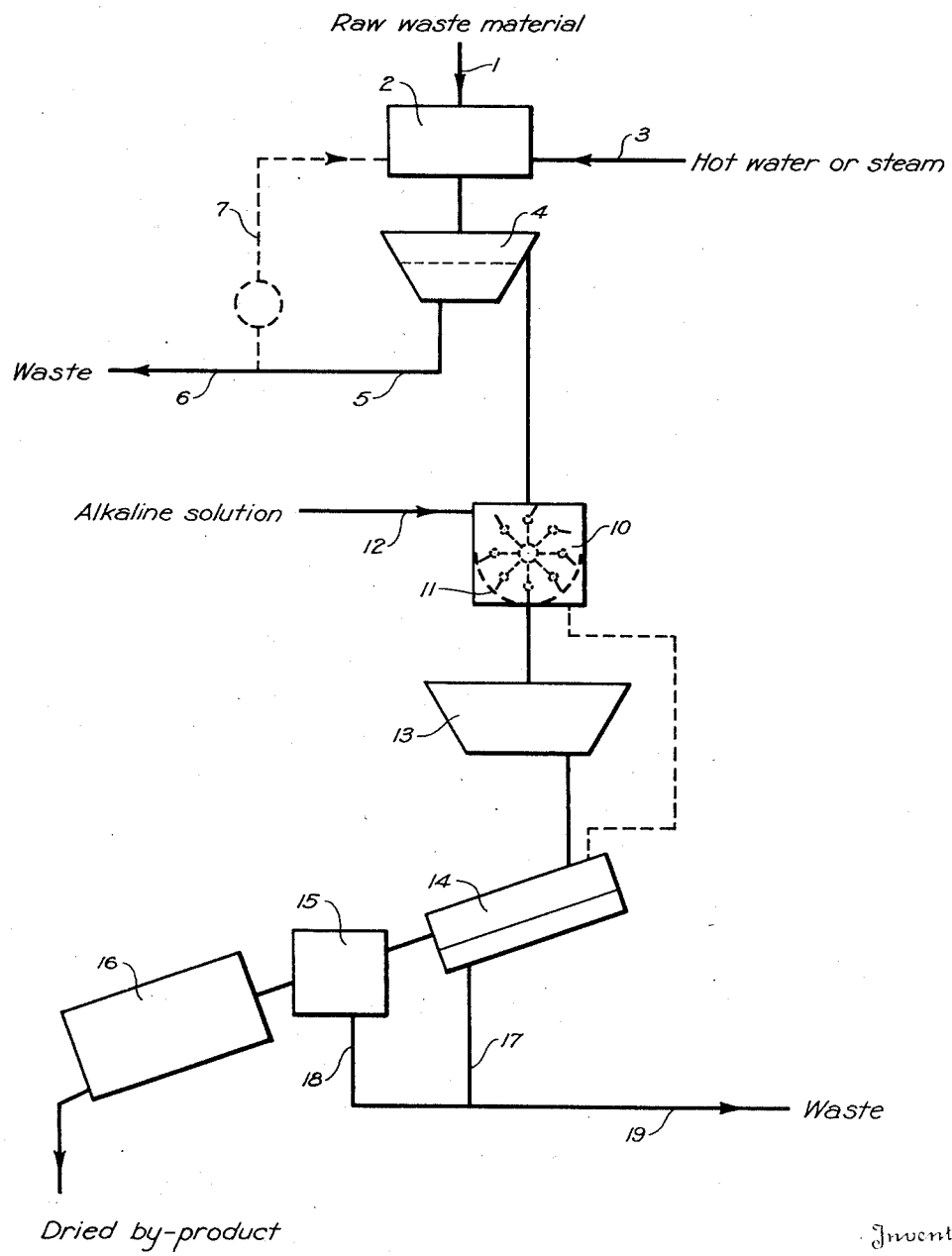
Inventor
A. W. Lissauer
By  W. E. Sherwood
Attorney Patented Jan. 16, 1940

2,187,501

UNITED STATES PATENT OFFICE 2,187,501

TREATMENT OF WASTE MATERIAL

Adolph W. Lissauer, Louisville, Ky., assignor to Louisville Drying Machinery Company, Louisville, Ky., a corporation of Kentucky Application October 24, 1936, Serial No. 107,409
Renewed July 24, 1939

9 Claims. (Cl. 99—2)

This invention relates in general to the treatment of waste material from which useful by-products may be recovered. As one example of its application, the invention is disclosed in connection with the recovery of a feed substance from the residues remaining in the processing of fruits, vegetables and the like. As is known, the pulp, skin, rinds, seeds and membrane left over from the processing of grapefruit, oranges, lemons, apples, beets, tomatoes and similar products contain valuable protein and other ingredients which render the same desirable as a feed product.

Many attempts have been made heretofore to recover these elements of the waste material but due to certain inherent characteristics of the material difficulty has been experienced in treating the same in a manner which is both commercially feasible and productive of a satisfactory by-product.

Due to its pectin content the waste material takes an amorphous form of extremely slimy character during certain stages of treatment. Consequently, it is practically impossible to handle the same in the usual mechanical screens, presses and driers. The tendency of such a jelly-like material is to retain moisture and to hold pectous substances in solution or in colloidal or mechanical suspension. This fact has resulted in considerable experiment directed toward chemical treatment of the waste material whereby the material acquires a body or firmness suitable for receiving subsequent mechanical dewatering and drying treatment.

However so far as is known, the methods of treatment heretofore developed have embodied certain disadvantages such as high cost of operation, excessive periods of time for completion, inferiority of the final products and problems of similar nature which have prevented their widespread adoption.

The present invention provides a solution to these problems and has as an object the teaching of a method for rendering waste materials normally incapable of treatment by mechanical apparatus suitable for such treatment.

A second object is the teaching of a method of recovering a useful by-product from waste materials in a rapid and economical manner.

A further object is the teaching of a method for treating waste material which has received prior preservative treatments.

Another object is the production of an improved by-product from waste materials.

Another object is the provision of a method of utilizing waste materials so as to eliminate the problem of disposing of the waste and the resultant elimination of a nuisance.

Other objects and advantages will become more apparent as the description proceeds when considered in connection with the accompanying diagrammatical drawing showing one manner in which the invention may be employed.

As will be apparent, the process of treatment now to be described may be used in connection with widely diversified types of waste material and it is to be expressly understood that the invention is limited in no way solely to the illustrative example of waste material herein specified. With this reservation in mind, the invention is shown as applied to the treatment of citrus fruit waste and more specifically to the treatment of grapefruit waste material.

After grapefruit is processed for the removal of the fruit sections, the juice and possibly the oils from its skin, a residue of wet pulp, skin and seeds remains for disposition by the processor. Although this residue is known to be valuable as a feed or as a fertilizer, the proper treatment of the same for producing these by-products has presented a problem. This waste having an inherent moisture-content of 80–85% or even higher is usually in the form of a wet mass having seeds, sections of peel or rind and rag from the interior of the fruit together with a large percentage of free water. Due to its pectin content this waste has a slimy, jelly-like character which renders it incapable of mechanical pressing or filtering with any measure of success. The material also tends to hold its moisture tenaciously and even when placed directly upon the soil surface as a fertilizer will lose its moisture very slowly with the result that it creates a nuisance during its slow decomposition process. Moreover, the practice in certain regions to coat the fruit with preservatives such as borax, or paraffine-like materials also tends to inhibit the reduction of the moisture-content of the waste when disposition of the same takes place.

In applying the present invention to a waste having characteristics such as described, a raw grapefruit waste previously untreated may be introduced at 1 into a tank 2. This waste may be either hot or cold and may be introduced either immediately after the fruit processing is completed or after it has stood for a length of time. Leading into tank 2 is a source 3 of clear hot water or steam of sufficient temperature and quantity to raise the temperature of the waste material to approximately 190° to 205° F. In general, the waste material is held in intimate contact with the hot water for approximately five minutes although it is apparent that this time may be varied depending upon the quantity and state of the waste material itself.

During this soaking stage in contact with the hot water two significant effects take place upon the waste material. The hot water first causes a swelling of the waste to occur and through the capillary action in the cells of the waste the water is enabled to leach out certain soluble pectins and other ingredients. Moreover, the swelling of the material places it in condition for subsequent treatment later to be described.

In the usual method a substantial quantity of soaking water perhaps of twice the weight of the waste material is introduced into tank 2 in order to effect a thorough pretreatment of the waste. In leaving the swelling and leaching stage the material and water pass into a preliminary filtering stage as indicated at 4. The large excess of wash water which now has assumed a milky appearance and has considerable soluble ingredients of the original waste in solution is removed from the filter at 5 and may be run off to waste at 6. As an alternative, a return system 7 may be provided whereby only a portion of the wash water runs to waste and a larger share recirculates through tank 2 with the source 3 supplying the make-up water.

The function of the filtering step at 4 is not to lower the inherent moisture-content of the waste at this phase, but merely to effect a rough separation of waste and excess wash water containing soluble pectins so that excessive quantities of material requiring large capacity apparatus and retaining the undesired soluble pectins will not be present in subsequent treatment. As a matter of fact, no satisfactory filtering to reduce the moisture-content within the waste could take place at this stage of operations since the swollen waste still retains the slimy, unhandleable characteristics above noted. However, this preliminary filtering does remove at 6 the major portion of the soluble pectins from later treatment and in this respect differs materially from prior processes in the art.

As will be obvious, any subsequent treatment of the waste at 6 may be made without departing from the essentials of the invention in the event that it is desired to recover soluble proteins and to add the same to the feed substance resulting from this process.

Although the removal of the soluble pectins during the soaking and filtering steps reduces the tendency of the waste to assume an amorphous form under mechanical treatment, nevertheless, sufficient of those ingredients in colloidal form still remain to make the material incapable of satisfactory mechanical treatment.

The filtered material in a swollen state then enters mill 10 which for example may be a conventional hammer mill functioning to crush the waste and to drive it in the form of small particles through a screen 11. Due to this severe beating and forging action the particles of swollen waste are uniformly crushed in a manner which is not possible in a simple agitating or conveyor structure. In so crushing the seeds, peel and rag of the waste, the glue-like pectin which had not previously been leached out from the waste is brought to the surface of the waste particles where it may enter into intimate contact with chemical agent. Simultaneously, an alkaline solution which may be formed from any of a number of compounds of alkali metals or alkaline earth metals is added at 12 to the waste entering mill 10. From experimentation it is believed that the reaction of these bases with the pectic acid in the waste matter and the resultant formation of a hard pectate salt is the cause of the advantageous change which later gives a body or firmness to the waste material and makes it handleable in mechanical apparatus. It appears that any of the alkali or alkaline earth metals will produce this result and the use of any particular agent in this class of chemicals will be governed only by the cost of the same and the characteristics desired in the final waste by-product. As an example, the use of lime in solution has proven to be successful in this process. It is found in the treatment of a certain grade of grapefruit waste that the addition of a solution having .3 to .5% of lime in suspension based upon the weight of the material being treated will give satisfactory results after the soluble pectins have been removed from the waste. The removal of the soluble pectins prior to adding the alkaline agent appears to decrease the viscosity of the waste material and results in a better mixing in mill 10 and a more immediate reaction setting in between the lime and the coagulable colloidal suspensions of the waste.

The lime and swollen waste of reduced pectin content and reduced viscosity entering mill 10 together with quantities of water in the lime solution are subjected to severe agitation and beating in the confines of the mill. If the waste comes from fruit which had received preservative treatment, the inhibiting effect of the preservatives upon the opening of the cell structures is overcome by the previous swelling treatment and the mechanical macerating taking place in the mill. The alkaline agent as a consequence enters into intimate contact with the cell structure of the waste and begins to react with the pectic acid therein to form a hard pectate, in this illustrative example, calcium pectate.

The rapidity with which the amorphous waste begins to take a definite body after the addition of the alkaline solution is thought to be due to the severe beating and intermixing which takes place in the hammer mill. It appears that the swollen cell structure of the waste is rapidly broken apart and that the colloidal or mechanical suspensions of the pectin therein are immediately brought into intimate contact with the base with which the pectic acid can immediately form a salt and thus by coagulation destroy the slippery, tenacious moisture-holding characteristic of the waste. It is found that the moisture-content of the swollen macerated waste leaving mill 10 is approximately 88-90% and that quantities of excess water introduced as an alkaline solution furthermore tends to dilute this wet material.

Upon leaving mill 10 the finely divided waste and the lime solution are directed into a settling vat 13 in which they are permitted to remain for a short retention period of about 30 to 60 minutes. As a result of the sequence of steps in the method of treating the material the waste begins to lose its slimy, amorphous character immediately after the lime is added in mill 10 and if desired the mixture leaving mill 10 could immediately be subjected to mechanical treatment as indicated by the dotted line in the drawing and give satisfactory results. One distinguishing feature of this invention is the rapid and economical process which results and when considered in contrast with prior treatments wherein both inorganic and organic substances are used for settling the waste with consequent extended periods of time, applications of heat and the like, the advantages herein resulting become more apparent.

When the mixture of macerated waste and alkaline solution has effected a satisfactory reaction it is directed into a filtering stage 14 of any suitable mechanical construction. Due to the physical change in state which is shown by the waste now having a body and becoming devoid of the slimy, amorphous character which it formerly had, the waste readily lends itself to the filtering process and does not clog the filter screens. In contrast with the preliminary filtering at 4 which was merely a rough separation of excess water with soluble elements from the slimy, swollen grapefruit refuse, this filtering step may partake both of the separation of the excess water from the diluted waste and the reduction of the inherent moisture-content within the waste. For example, a filtering apparatus of the nature shown in United States Letters Patent 1,669,973 to J. Credo may well be employed at this stage although it will be obvious that any other efficient apparatus may be used without departing from the invention.

The filtered solids leaving filter 14 then pass into a pressing apparatus as indicated at 15 and due to the definite form which they now possess may be passed between rolls and have excess inherent moisture expressed therefrom. Upon leaving press 15 it is found that the solids in the form of a damp cake of grapefruit waste have a moisture-content approximating 70–75% moisture. Solids of this nature are suitable for treatment in the efficient steam tube type of drier as shown at 16 and when passed therethrough form a dried by-product of grapefruit waste which possesses valuable properties.

The excess liquid and the inherent moisture removed from the waste in the filter and press may pass through pipes 17 and 18 into a waste pipe 19 from which they may be led to waste or to a subsequent treatment for recovering values therefrom.

The dried by-product resulting from this process is found to possess valuable characteristics indicating a far superior product to that heretofore produced. Not only is the product free from discoloration, but it also possesses the desired property of being highly moisture absorbing. Experiments indicate that the dried product can absorb up to five times its weight in moisture thus making it highly desirable as a stock feed which may be used independently or in a mixture with other feeds. Since the coagulated colloidal suspensions of pectin are retained in the final product, the soluble pectins alone being sent to waste, it is found that the by-product possesses a satisfactory protein content.

Likewise, the waste which contains merely the soluble pectins and alkaline solution cannot later putrify and consequently present no problem as a nuisance. Among the many advantages of the invention will be noted the fact that several steps of treatment considered indispensible in prior processes relating to this art have been omitted and that the present process may be continuous, rapid and economical while at the same time productive of a superior by-product.

It is apparent that any suitable apparatus employing conventional actuating and control means may be used in the practice of the invention. Likewise, it is obvious that the invention is not to be limited solely to treatment of the single material herein disclosed as an example, but on the contrary may be used in the treatment of allied forms of organic waste wherein the characteristic of the waste must be first changed in order to render it capable of receiving mechanical treatment.

Having thus disclosed the invention, I claim:

1. In the treatment of citrus waste normally incapable of mechanical dewatering treatment, the method of dewatering the same comprising, removing soluble pectins from the waste and reducing the viscosity thereof, beating the insoluble waste into small crushed particles in the presence of an alkali and alkaline earth solution in order to form a pectate salt therein and then mechanically removing moisture from the resulting body of material containing the pectate salt.

2. In the recovery of food values from a raw waste of fruit or similar material incapable of mechanical dewatering treatment, the method of changing the physical state thereof comprising, soaking the waste in hot water and causing a swelling of the waste while leaching out the soluble ingredients therefrom, removing the soluble ingredients, beating the waste into small, crushed particles and simultaneously adding an alkaline solution thereto whereby the alkaline material may penetrate the waste and react therewith to give a tangible, handleable body thereto.

3. The method of treating organic wastes by means of inorganic agents in order to render the wastes susceptible to mechanical treatment comprising, removing soluble pectins from the organic waste and swelling the insoluble organic material in the presence of moisture by means of heat, adding an inorganic agent such as lime in a solution to the insoluble organic waste, beating the swollen waste into small, crushed particles and driving the lime into the insoluble organic material to form a pectate salt therein by chemical reaction whereby the organic material will acquire a body susceptible to mechanical handling.

4. The method of dewatering amorphous waste material normally incapable of mechanical treatment comprising, soaking the material in a hot medium and expanding the pores of the material for ready reception of a coagulating agent, removing soluble ingredients having a tendency to retard coagulation and requiring use of excessive coagulation agent, mixing an alkaline coagulation agent with the swollen insoluble material and simultaneously beating the material into small, crushed particles and driving the agent into intimate contact with the material to form a body of the same through chemical reactions, and mechanically removing moisture from the resulting body of material preparatory to drying.

5. The process of treating citrus and similar wastes comprising, soaking the raw waste in hot water and leaching out soluble constituents while forming the waste into a permeable mass, removing the soluble waste, adding an alkaline solution to the insoluble waste and simultaneously beating the waste into small, crushed particles to form an intimate mixture with the solution, settling the mixed material, removing moisture from the settled material and drying the material to form a useful by-product.

6. The method of disposing of putrefiable waste citrus products to avoid a nuisance and to recover a valuable by-product comprising, removing soluble pectin from the raw waste by soaking the same in water and separately disposing of the resulting non-putrefiable soluble solution, coagulating the insoluble putrefiable organic matter by an alkaline solution, expressing the non-putrefiable liquid from the coagulated waste and separately disposing of the same and drying the coagulated pressed organic matter to form a stock feed therefrom.

7. In the recovery of feed values from fruit and similar wastes in a permeable, amorphous state incapable of efficient mechanical dewatering treatment in a continuous process, the method of changing the physical state thereof comprising, simultaneously beating the waste into small crushed particles while adding an alkaline solution thereto whereby the alkaline material may penetrate and coat the waste while reacting with constituents of the waste in order to give a tangible, handleable body to the waste and permit a continuous process without clogging the mechanical apparatus.

8. An improvement in the method of recovering feed values from pectin-containing fruit and similar wastes by beating the wastes into small crushed particles and thereafter dehydrating them comprising: conducting the beating operation in the presence of an alkaline material.

9. In the recovery of feed values from pectin-containing fruit and similar wastes in a permeable, amorphous state incapable of efficient mechanical dewatering treatment, the step of changing the physical state thereof comprising: beating the waste, in the presence of an alkaline solution, into small crushed particles whereby the alkaline material may penetrate and coat the waste while reacting with constituents of the waste in order to give a tangible, handleable body to the waste.

ADOLPH W. LISSAUER.